United States Patent
Frankel

(12) 
(10) Patent No.: US 10,072,966 B1
(45) Date of Patent: Sep. 11, 2018

(54) SYSTEM AND METHOD FOR FRAUD-FREE SCRAP REMOVAL AND ACCOUNTING

(71) Applicant: Advanced Steel Recovery, LLC, Rancho Cucamonga, CA (US)

(72) Inventor: Nathan Frankel, Rancho Cucamonga, CA (US)

(73) Assignee: ADVANCED STEEL RECOVERY, LLC, Rancho Cucamonga, CA (US)

( * ) Notice: Subject to any disclaimer, the term of this patent is extended or adjusted under 35 U.S.C. 154(b) by 0 days.

(21) Appl. No.: 15/791,171

(22) Filed: Oct. 23, 2017

(51) Int. Cl.
| | |
|---|---|
| *G06Q 10/00* | (2012.01) |
| *G01G 19/413* | (2006.01) |
| *G01G 19/415* | (2006.01) |
| *G06K 7/14* | (2006.01) |
| *G01G 23/42* | (2006.01) |
| *G01G 19/00* | (2006.01) |
| *G06K 7/10* | (2006.01) |
| G01G 19/414 | (2006.01) |

(52) U.S. Cl.
CPC ............ *G01G 23/42* (2013.01); *G01G 19/00* (2013.01); *G01G 19/415* (2013.01); *G06K 7/10475* (2013.01); *G06K 7/1413* (2013.01); *G06K 7/1417* (2013.01); *G06Q 10/30* (2013.01); G01G 19/4144 (2013.01)

(58) Field of Classification Search
CPC .. G06Q 10/30; G06K 7/10475; G06K 7/1413; G06K 7/1417; G01G 19/00; G01G 19/02; G01G 19/021; G01G 19/08; G01G 19/083; G01G 19/10; G01G 19/12; G01G 19/40; G01G 19/4144; G01G 19/415; B30B 9/3007

See application file for complete search history.

(56) References Cited

U.S. PATENT DOCUMENTS

| | | | | |
|---|---|---|---|---|
| 4,605,081 | A * | 8/1986 | Helmly, Jr. ............ | G01G 19/02 177/1 |
| 4,714,122 | A * | 12/1987 | Appleton ................. | B65F 3/04 177/139 |
| 4,771,837 | A * | 9/1988 | Appleton ................. | B65F 3/04 177/139 |
| 4,773,027 | A * | 9/1988 | Neumann ............ | B30B 9/3007 100/229 A |
| 4,854,406 | A * | 8/1989 | Appleton ................. | B65F 3/04 177/139 |

(Continued)

OTHER PUBLICATIONS

"Construction Waste Management: Section 01 74 19", United States Environmental Protection Agency, Dec. 2007.*

(Continued)

*Primary Examiner* — Randy Gibson
(74) *Attorney, Agent, or Firm* — Cislo & Thomas, LLP

(57) ABSTRACT

A method and system for removing and accounting for scrap removed from a facility by providing a plurality of collection bins for one or more customers to collect scraps, providing a weigh station having a scale to weigh the scrap collected, providing a computer to record and keep track of the total scrap collected by each customer, providing a plurality of waste bins to discard the scrap collected in the collection bin, and accounting for the total scrap collected for each customer on-site before the waste bins are removed for permanent disposal. The collection bins of each customer can be monitored using a tracking system, such as a tag and reader, GPS device, camera, and the like.

26 Claims, 4 Drawing Sheets

(56) References Cited

U.S. PATENT DOCUMENTS

| | | | | |
|---|---|---|---|---|
| 5,016,197 A * | 5/1991 | Neumann | B30B 9/3007 | 100/229 A |
| 5,173,866 A * | 12/1992 | Neumann | B30B 9/3007 | 100/229 A |
| 5,214,594 A * | 5/1993 | Tyler | B30B 9/3007 | 100/229 A |
| 5,230,393 A * | 7/1993 | Mezey | B65F 3/08 | 177/139 |
| 5,303,642 A * | 4/1994 | Durbin | B30B 15/26 | 100/193 |
| 5,558,013 A * | 9/1996 | Blackstone, Jr. | B30B 9/3007 | 100/218 |
| 5,631,835 A * | 5/1997 | Hagenbuch | G01G 19/08 | 177/136 |
| 5,644,489 A * | 7/1997 | Hagenbuch | G01G 19/08 | 177/139 |
| 5,837,945 A * | 11/1998 | Cornwell | B65F 3/04 | 177/136 |
| 6,123,017 A * | 9/2000 | Little | B30B 9/3007 | 100/229 A |
| 6,408,261 B1 * | 6/2002 | Durbin | B30B 9/3007 | 100/99 |
| 6,561,085 B1 * | 5/2003 | Durbin | B30B 9/3007 | 100/229 A |
| 6,687,656 B2 * | 2/2004 | Durbin | B30B 9/3007 | 340/449 |
| 7,009,118 B2 * | 3/2006 | Pottebaum | G01G 19/12 | 177/136 |
| 7,146,294 B1 * | 12/2006 | Waitkus, Jr. | B30B 9/3007 | 702/188 |
| 8,330,059 B2 * | 12/2012 | Curotto | G06Q 10/30 | 177/136 |
| 8,674,243 B2 * | 3/2014 | Curotto | G06Q 10/30 | 177/136 |
| 9,342,884 B2 * | 5/2016 | Mask | G06K 9/00201 | |
| 9,347,818 B2 * | 5/2016 | Curotto | G06Q 10/30 | |
| 9,824,337 B1 * | 11/2017 | Rodoni | G06Q 10/30 | |
| 2002/0194144 A1 * | 12/2002 | Berry | B65F 1/0006 | 705/414 |
| 2004/0039595 A1 * | 2/2004 | Berry | B65F 1/0006 | 705/308 |
| 2009/0161907 A1 * | 6/2009 | Healey | B65F 1/14 | 382/100 |
| 2010/0071572 A1 * | 3/2010 | Carroll | B30B 9/3007 | 100/229 A |
| 2014/0214697 A1 * | 7/2014 | McSweeney | B65F 1/004 | 705/308 |
| 2014/0379588 A1 * | 12/2014 | Gates | G06Q 10/0631 | 705/308 |
| 2015/0307273 A1 * | 10/2015 | Lyman | G01G 19/08 | 705/7.13 |
| 2016/0203446 A1 * | 7/2016 | Lee | G06Q 10/30 | 705/308 |
| 2016/0379154 A1 * | 12/2016 | Rodoni | G06Q 10/063114 | 705/7.15 |
| 2017/0010149 A1 * | 1/2017 | Whitman | B65D 21/086 | |
| 2017/0011362 A1 * | 1/2017 | Whitman | B65D 21/086 | |
| 2017/0011363 A1 * | 1/2017 | Whitman | B65D 21/086 | |
| 2017/0116583 A1 * | 4/2017 | Rodoni | G01G 19/02 | |
| 2017/0308871 A1 * | 10/2017 | Tallis | G05B 15/02 | |

\* cited by examiner

SYSTEM AND METHOD FOR FRAUD-FREE SCRAP REMOVAL AND ACCOUNTING

TECHNICAL FIELD

This invention relates to the scrap (or scrapping) industry.

BACKGROUND

In the scrap industry, customers who produce scrap for removal from a facility are paid based on the weight of the scrap removed. Customers at a site or facility collect scrap in collection bins and dump the scrap collected in the collection bin into a waste bin. Once a waste bin is filled up, the waste bin is taken off-site by a service provider where it can be weighed. Based on the weight of the scrap, the customer is paid.

Unfortunately, the system as currently used and deployed tempts unscrupulous service providers to defraud the customers by recording a weight of the scrap that is less than the actual weight produced by the customer. Because the weighing of the scrap is performed off-site, the customers have no way of corroborating the amount of scrap removed. For example, once the scrap has left the facility, some of the collected scrap can be removed before weighing or numbers altered after weighing. When the receipt documenting payment for the scrap is generated for the customers, the amount of weight produced by the facility may be more than the actual amount documented by the service provider. Unfortunately for the customer, there is no way for the customer to know that their load had been tampered with, or information modified.

For the foregoing reasons, there is a need for a system that allows customers to have their scrap weighed on-site and kept track of so as to reduce the possibility of tampering with the actual weight of the scrap produced by a customer.

SUMMARY

The present invention is directed to a method and system that reduces, and may even eliminate, the chance and ability of a service provider to defraud its customers by paying to the customer on an amount of scrap that is less than the actual amount of scrap collected/produced by the customer. The method and system comprises a weigh station operatively connected to a computer to weigh, record, and keep track of the amount of scrap collected by a customer in real time on-site. When scrap collection is complete, the customer can receive an invoice printed on-site before the collected waste bin leaves the facility.

In some embodiments, smaller collection bins are provided to collect the scrap and dump into larger waste bins. When collection is complete, the larger waste bins can be taken off-site for permanent removal and disposal.

In some embodiments, the system may comprise a tracking system that allows the system to keep track of into which particular waste bins customers have dumped their scrap.

The collection bins and/or waste bins may comprise tags, electronic or analog, so that individual customer activity can be monitored in real time.

The weigh station may comprise a reader that can read the tag and record the weight of the scrap collected for the identified customer and correlate the weight with a particular collection bin.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1A:
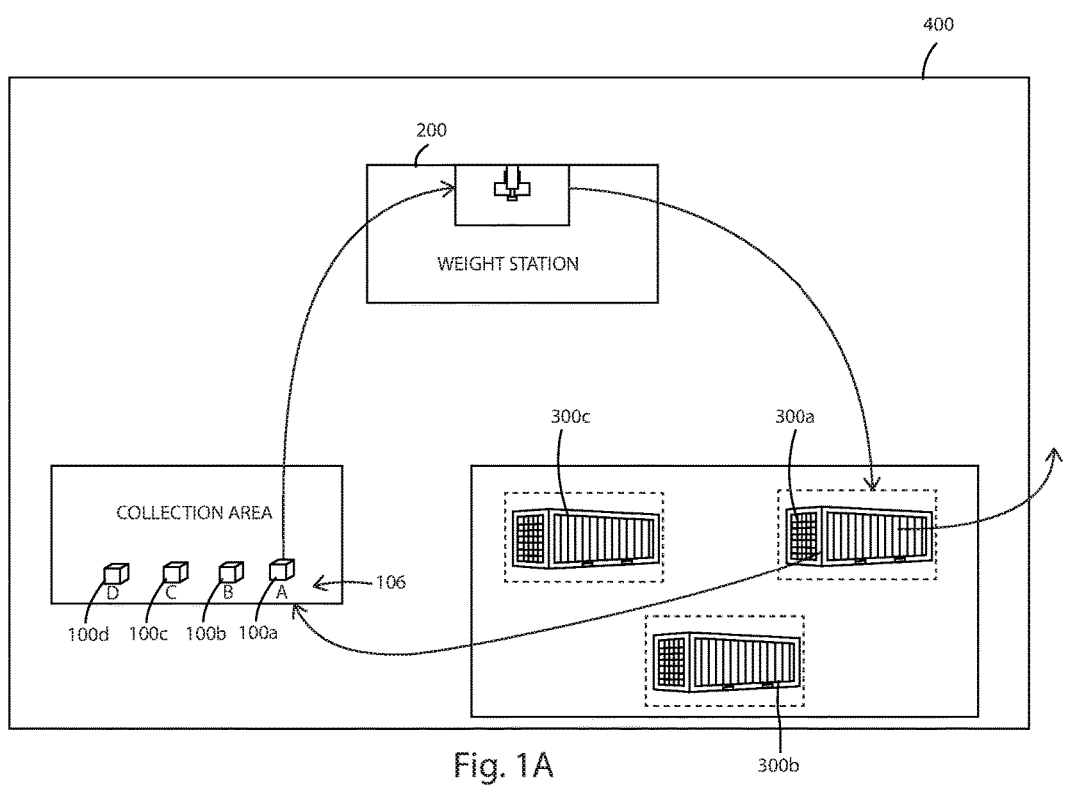
FIGS. 1A and 1B show a schematic representation of an embodiment of the present invention.
Figure 1B:
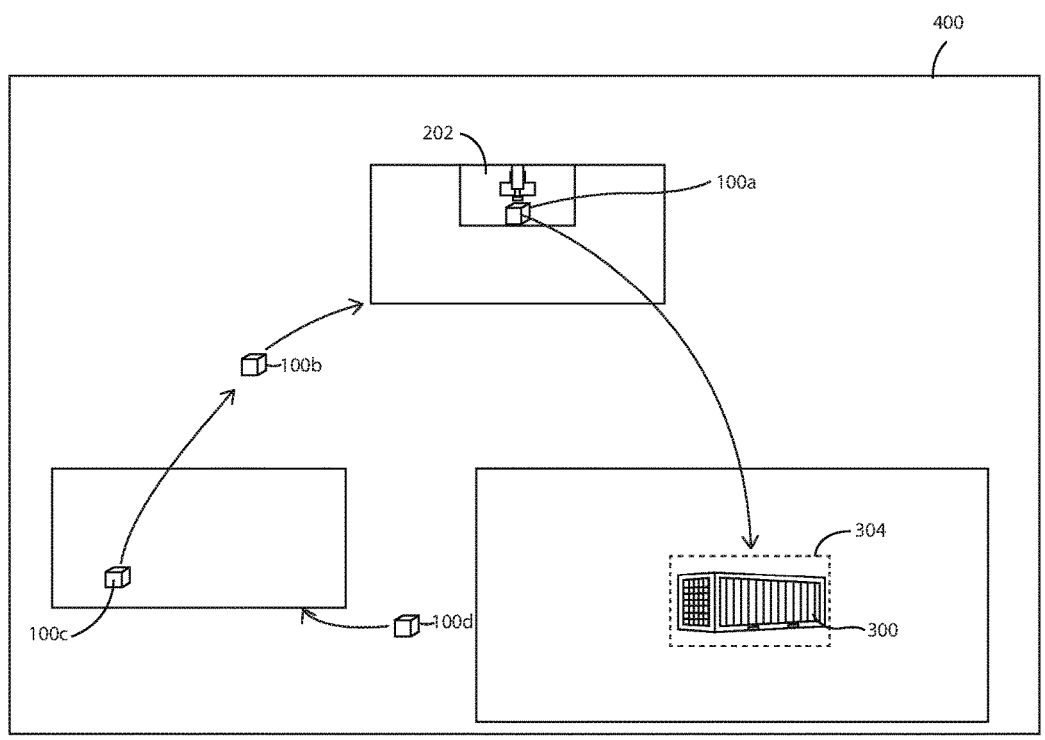

As shown in FIGS. 1A and 1B, a system of the present invention comprises a collection bin 100 for collecting scrap, a weigh station 200 for weighing the scrap, and a waste bin 300 for collecting accumulated scrap from the collection bin 100. At any desired point in time, the waste bin 300 may be taken off site for permanent removal of the collected scrap, then returned back to the facility to collect further scrap at the facility.

In a preferred embodiment, a plurality of collection bins 100a-d may be used for collecting scrap and dumping the scrap into the waste bin 300. In some embodiments, a plurality of waste bins 300a-c may be provided to maintain a constant flow of scrap removal. As one waste bin 300a reaches capacity, the full waste bin can be hauled away, and a new empty waste bin 300b may be used to replace the full waste bin 300a that was hauled away. In the meanwhile, a third waste bin 300c remains usable during this time.

One feature of the present invention is ability to keep track of the total weight of the accumulated scrap collected by a customer because the customer is paid by the weight of scrap collected and removed from the facility 400.

Figure 2:
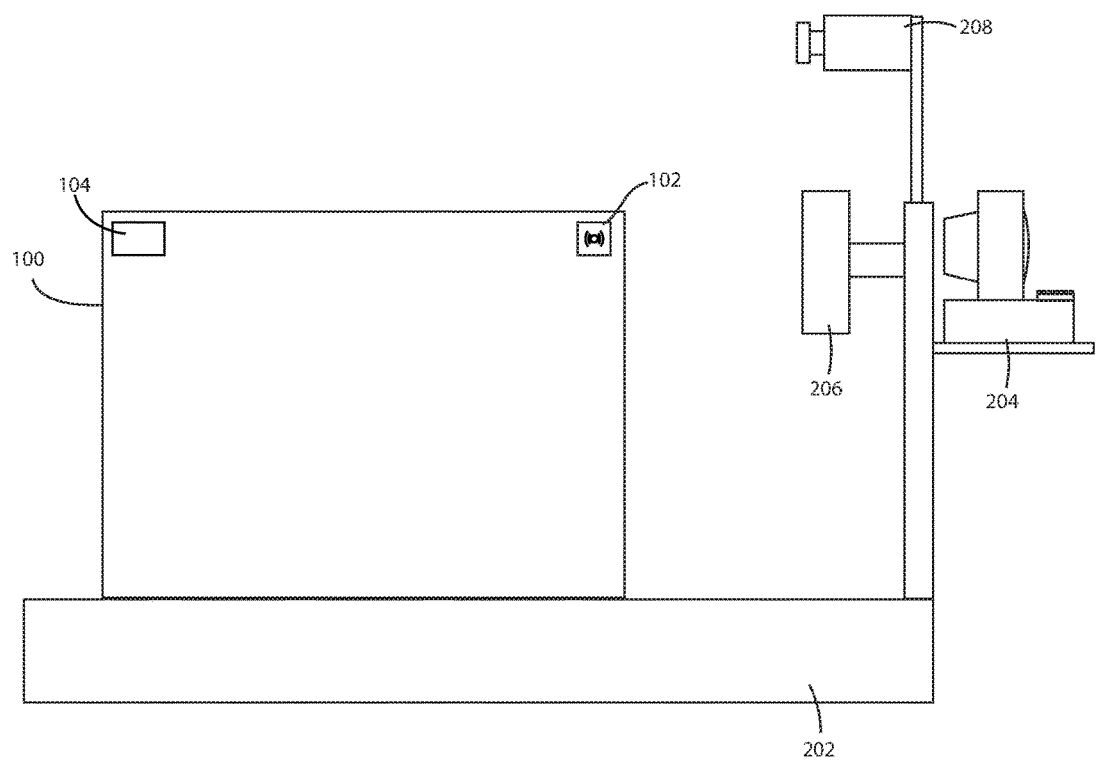
FIG. 2 shows an elevation view of a weigh station with a collection bin.

The weight of scrap collected by the customer is monitored and recorded at the weigh station 200. As shown in FIG. 2, the weigh station 200 comprises a scale 202 and a computer 204 operatively connected to the scale 202. The scale 202 is used to measure the actual weight of the scrap. For example, the collection bin 100 may be filled with scrap and then placed on top of the scale 202. The scale 202 measures the gross weight of the collection bin 100 containing the scrap. The weight of the collection bin 100 (i.e. bin weight or tare weight) may be known or may have been previously determined. The bin weight can be subtracted from the gross weight to determine the net weight of the collected scrap. Alternatively, the system can log the number of entries of the collection bin 100 and sum the weights of each entry at any stage, also summing the tare weights of the collection bin 100 and later calculating the accumulated net weight of the scrap. In other words, calculating the net weights does not need to happen on a bin by bin basis. The weighed scrap can then be dumped into the waste bin 300 for temporary storage until the waste bin 300 reaches capacity. This event can be logged on the computer 204 to keep track of the current weight of the scrap in the waste bin 300.

To illustrate the main concept, the following description will describe a single collection bin 100, a single weigh station 200, and a single waste bin 300 at a facility 400. The customer fills the collection bin 100 with the scrap. Once the collection bin 100 is full, the customer takes the collection bin 100 full of scrap to the weigh station 200. The customer has the collection bin 100 weighed at the weigh station 200 on-site at the facility where the scrap is located. After the collection bin 100 has been weighed, it is sent to the waste bin 300 for disposal. In the meanwhile, the net weight of the scrap collected in the collection bin 100 is recorded on the computer 204 for all parties interested. After the collected scrap in the collection bin 100 is dumped into the waste bin 300, the collection bin 100 is available to collect more scrap. As a redundancy check, after the collected scrap in the collection bin 100 is dumped into the waste bin 300, the collection bin 100 may be weighed again to assure that all of the collected scrap had been dumped into the waste bin 300 or it can be visibly verified empty. If the weight of the collection bin 100 measured after the scrap had been dumped into the waste bin 300 (the post-dump weight) does not equal the bin weight, then it is likely that not all of the scrap had been removed from the collection bin 100 during the dump. As such, the bin weight may have to be revised for calculating the next net weight of the scrap for that collection bin. Once the waste bin 300 has reached a designated level, such as full capacity, as defined by the customer, service provider or designee, to the customer's satisfaction, until the scrap has run out, or the like, the waste bin 300 is taken off-site for permanent disposal. Because the weighing of the scrap was done on-site, the waste bin no longer requires to be weighed off-site as in traditional scrap handling activities. Although, it can be as a confirmatory data check.

When the next round of scrap is collected, weighed, and dumped into the waste bin 300, the net weight (or gross weight, etc. "weight data", generally) of the second round of scrap dumped is added to the weight of the first round of scrap dumped to determine a cumulative weight of the scrap in the waste bin 300. This process of collecting scrap in the collection bin 100, weighing the collection bin 100 and scrap at the weigh station 200, determining the net weight of the scrap, dumping the scrap from the collection bin 100 into the waste bin 300, and recording the cumulative weight of the scrap in the waste bin 300 is repeated until the waste bin 300 is ready to be removed from the facility 400. The waste bin 300 is ready to be removed from the facility when the waste bin 300 has reached a predetermined capacity, or if a user designates the waste bin 300 is ready for removal.

Each time scrap from the collection bin 100 is dumped into the waste bin 300, the cumulative weight of the scrap is increased by the net weight of the scrap of the current dump. The cumulative weight of the scrap in the waste bin can be recorded on the computer 204 at the weigh station 200. In some embodiments, the weight of the scrap can be transmitted to a computer off-site and recorded. When the waste bin is ready for removal, the computer 204 can generate a receipt for the scrap in the waste bin 300 that is being removed for a particular customer. Receipts can be generated at the site or by the service provider, for example, with a mobile printer and mobile device app that manages the bin swaps, weight records or weight data, printing process, and information distribution. Because the receipt is generated while the waste bin 300 is still at the facility 400 within a short time period of the last dump, there is very little time or opportunity to manipulate the data (i.e. the total cumulative weight in the waste bin). The time span between the last dump and the removal of 300 by the service provider can be irrelevant toward the risk of weight falsification because the bin 300 remains onsite and in control of the customer. The time span that is critical is the time between when the report is generated and when the service provider touches the bin 300. Since the report is generated prior to the service provider touching the bin 300, the element of fraud by the service provider can be eliminated. Therefore, the receipt generated will be as accurate as possible with little to no ability to commit fraud by changing the cumulative weight of the scrap in the waste bin 300.

To improve the efficiency of scrap disposal, a plurality of collection bins 100a-d may be used so that scrap is regularly being weighed and disposed. For example, a first collection bin 100a filled with scrap may be weighed at the weigh station 200. In the meanwhile, a second collection bin 100b filled with scrap may be in route to the weigh station, while a third collection bin 100c is being loaded with scrap. A fourth collection bin 100d, whose contents were already dumped into a waste bin may already be in route back to the collection area. As the first scrap load is removed and dumped into the waste bin 300, the net weight of the first scrap load is determined and recorded. In the meanwhile, the second collection bin 100b is weighed, the third collection bin 100c is placed in route to the weigh station, and the fourth collection bin 100d is returned to the collection-site to be filled with more scraps. Many more collection bins may be added to this process for a continuous scrap removal system. If the collection bins 100a-d are all used by the same customer, each time the collection bins 100a-d are weighed, the net weights of each load is measured, recorded, and added to the previous net weights to keep track of the cumulative weight of all scrap loads discarded into the waste bin 300 for that customer. Because all of the scrap is dumped into the same waste bin 300, the cumulative weight of all scrap loads discarded would reflect the amount of scrap in the waste bin 300.

When the waste bin 300 reaches capacity or when it is determined that dumping into the waste bin 300 is complete, the cumulative weight of the scrap in the waste bin 300 will already be known and a receipt or account of the contents can be generated on the spot before the scrap even leaves the facility. Because the receipt is generated before the scrap leaves the facility, or even before the service provider handles the collected scrap, there is very little time or opportunity to manipulate the weight of the scrap in an attempt to defraud the customer.

To further improve the efficiency of the process, a plurality of waste bins 300a-c may be implemented. As one waste bin 300a is filled to capacity, the waste bin 300a can be removed from the facility 400 for permanent disposal of the scrap. A new empty waste bin 300b can be placed where the first waste bin 300a was located. In the meanwhile, a third waste bin 300c may be available while the first waste bin 300a is being removed and replaced. When the third waste bin 300c reaches capacity, the truck that removed the first waste bin 300a may have returned with a fourth empty waste bin. The third full waste bin 300c can be removed and replaced with the fourth empty waste bin, as another empty waste bin is made available. Depending on a number of factors, such as the amount of waste generated, the number of personnel available to move the collection bins 100, the distance the trucks have to travel, and the like, the appropriate number of collection bins 100, weigh stations 200, waste bins 300, and trucks can be provided to establish a steady flow of scrap disposal and removal.

To further complicate the matter, the facility 400 may have a plurality of service providers each removing scrap for disposal from the facility 400. In some embodiments, each service provider may be assigned one waste bin 300. Each waste bin 300 may have its own weigh station 200 associated with it. In this embodiment, the scrap measured at one weigh station 200 will always be dumped into the same designated waste bin 300. Therefore, the amount of scrap in that waste bin 300 is simply the cumulative weight of the scrap weighed at that weigh station 200. Because the waste bin 300 is assigned to a single service provider, all of the scrap accumulated can be attributed to that service provider. If the service provider only received scrap from a single customer, then before the waste bin 300 is hauled away, an invoice receipt can be generated at the weigh station for an accurate accounting for that customer. If, however, multiple customers are dumping their scrap into the same waste bin 300, then the service provider will have to keep track of its customers' activities for an accurate accounting for each customer In some embodiments, various waste bins 300 can link back to a single weigh station 200, because the weigh station 200 is keeping track of each collection bin 100 and therefore can allow for discrete weight accumulations of different waste bins 300 so long as each collection bin 100 is uniquely associated with a particular waste bin 300. In some embodiments, a particular collection bin 100 can dump into different waste bins 300 because the scrap being dumped can be associated with the collection bin 100. Alternatively, the facility 400 can have multiple, simultaneous instances of collection bins 100, waste bins 300, and weigh stations 200 (or any combination of them) even if only contracted with one service provider. The customer may have to be cognizant of which collection bin 100 is dumping into which waste bin 300. The service provider assumes that, in his absence (during the daily course of the customers collection and dumping operations), the customer is properly associating its collection bin 100 with the correct waste bin 300.

To facilitate the customer dumping its scrap into the proper waste bin, in some embodiments, specific collection bins 100 may be designated to be dumped into specific waste bins 300. By way of example only, waste bins 300 and collection bins 100 may be color-coordinated. Therefore, collection bins 100 can only be dumped into waste bins 300 of the same color.

Other variations of this type of collection bin/waste bin correspondence have been contemplated in light of the above examples. As mentioned above, one issue that arises from this type of embodiment is that it relies on the user accurately dumping the scrap from a specific collection bin 100 into the proper waste bin 300. If the user does not comply with the instructions for dumping, then the accounting of the cumulative weight of scrap in the waste bins 300 will not be accurate.

To relieve the customer of its duty of dumping its collected scrap into a properly designated waste bin 300, the system may further comprise a tracking system to monitor the customers' or service provider's activities. For example, the tracking system can detect which collection bin 100 is being weighed at the weigh station 200 to attribute the collected scrap to that customer, where the collection bin is coming from, and where the collection bin is going.

For example, the facility may have a plurality of collection bins 100*a-d*, one weigh station 200, and a plurality of waste bins 300*a-c*. The tracking system may comprise a tag 102 and a reader 206 to electronically track the accumulated weight for each customer. In the preferred embodiment, each collection bin 100 may be labeled with a tag 102. The tag 102 may contain identifying information of the customer and/or service provider, such as name, address, account number, and the like. By way of example only, the tag 102 may be an RFID chip, a barcode, a QR code, or the like.

Likewise, the reader 206 may be an RFID reader, a barcode reader, a QR code reader, or the like. The reader 206 may be placed at the weigh station 200. When a collection bin 100 is brought to the weigh station 200 for weighing, the reader 206 reads the tag 102 to record the identification of the collection bin 100 being weighed and the characteristics of the collection bin 100, such as its tare weight, allowing the net weight of the scrap to be calculated in real time or in a deferred time, for that collection bin 100. When that collection bin 100 returns with a second load of scrap, the new weight of the second load of scrap is added to the first load of scrap for an accumulated weight of scrap collected by that collection bin 100. Each time the same collection bin 100 returns for weighing, the accumulated weight of scrap collected for that collection bin 100 is updated. After each weighing episode, the weighed scrap is dumped into any waste bin 300*a-c*.

At the end of the day, or some other designated period of time, or when the customer is otherwise ready to receive an accounting of the scrap collected for that period of time, the weigh station 200 can generate a receipt based on the total accumulated weight of scrap that the collection bin 100 collected from that customer. Or, the weigh station 200 can also inform the customer or service provider the accumulated weight in any bin 300 by virtue of the collection bin's 100 predetermined assignment to a waste bin 300 or by virtue of tracking the collection bin's 100 movement using a geo-locating device (for example, by GPS, BlueTooth, NFC, Beacon Technology, or any other technology that can locate a person, place, or thing) to whatever waste bin 300 into which the content of the collection bin 100 was deposited. In such an embodiment, the customer can simply dump the collected scrap in any waste bin 300; however, the same customer must use the same collection bin 100 so that the scrap collected can be attributed to that customer.

In some embodiments, the tracking system may comprise a camera 208 that can monitor the movement of the collection bins 100 and, optionally, the location of the waste bins 300. For example, each customer may have a designated origin point where the scrap is collected. Each origin point may have a unique identifying label 106 for the customer. The camera 208 may be positioned to detect the identifying label 106 and the collection bin 100. The computer 204 operatively connected to the camera 208 may be installed with optical character recognition software to read the identifying label 106. By identifying which origin point the collection bin 100 is coming from, the weigh station 200 can attribute the incoming collection bin 100 to the proper customer or the specific origin point for the scrap within a customer's facility. The camera 208 can also monitor which waste bin 300 the scrap was dumped into. The empty collection bin 100 can then be returned to any origin point as the system can keep track of the customers' scrap collection not based on the collection bin 100, but rather, from the origin from where the collection bin 100 departs. This allows the customer to use any available collection bin 100; however, the collection bin 100 must always be placed at the correct origin when the scrap is collected in order for the system to be able to detect to which customer a particular collection of scrap should be attributed. The camera tracking system can also be relied on for confirming whether a fraud has been committed. Should any kind of fraud be suspected, the video footage can be reviewed to determine where, when, how, and by whom the fraud occurred. Therefore, the camera system can be used in conjunction with the tag 102 and reader 206. The origin may be a designated location, a structural platform, a transport vehicle, and the like that can be used to identify customer specific origin of scrap or 100 specific origin of scrap. For example, as collection bin 100 is typically moved with a forklift, a specific forklift may be used to associate collection bin 100 with a specific customer, service provider or waste bin 300.

In some embodiments, it may be desirable to know into which waste bins 300a-c the scraps were dumped. For example, although the primary goal is to assure the customers that they are being compensated for the full load of scrap collected, there exists a potential for the customer to defraud the service provider by removing scrap after it had been weighed and before dumping the scrap into a waste bin 300. The customer could then return with the same scrap previously weighed as a means for claiming that it collected more scrap than it actually did.

Figure 3:
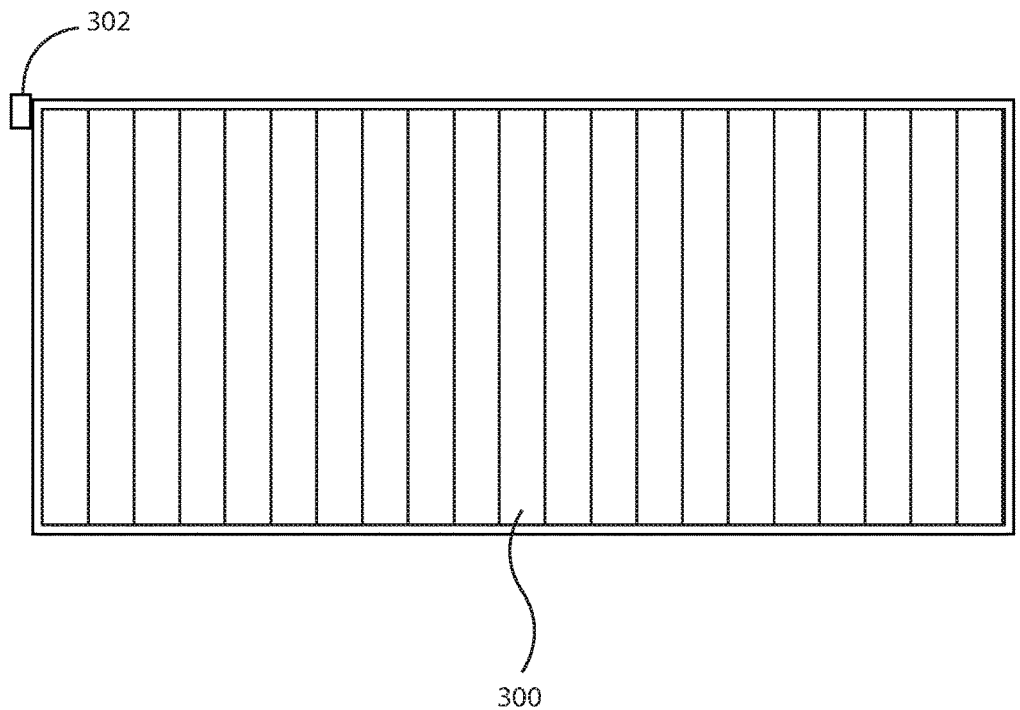
FIG. 3 shows an elevation view of a waste bin.

To assure that weighed collection bins 100 are sent to a waste bin 300 for dumping, each waste bin 300 may also comprise a reader 302 as shown in FIG. 3. Once a collection bin 100 is weighed, this weighing event is recorded by the computer 204 for a particular customer. Before crediting the scrap to the customer 204, the computer awaits confirmation from one of the waste bins 300 indicating that it has received scrap from the weighed collection bin 100. Once the collection bin 100 arrives at any waste bin 300, that waste bin 300 reads the tag 102 on the collection bin 100 then transmits the tag information of the collection bin 100 and the identification of the waste bin 300 to the computer 204. The computer 204 records the cumulative weight of the scrap deposited into that specific waste bin 300 corresponding to the cumulative weight of the scrap collected by the customer. When the waste bin 300 is removed for final disposal, the weight of the waste bin 300 can be measured at the final disposal site. The total accumulated weight of scrap in the waste bin 300 should equal the total cumulative weight of all customers who had dumped their scrap into that waste bin 300 during that period of time.

In this embodiment, there arises a possibility that a weighed collection bin 100 passes by a first waste bin 300a en route to a second waste bin 300b. The intent may be to dump the contents of the collection bin 100 into the second waste bin 300b, but having passed by the first waste bin 300a, the reader 302 of the first waste bin 300a may inadvertently read the tag 102 of the collection bin 100 passing by and erroneously send a signal to the computer 204 indicating that the collection bin 100 had dumped its contents into the first waste bin 300a.

To reduce this possibility, the readers 302 of each of the waste bins 300 may be positioned at a location on the waste bin 300 that prevents the reader 302 from reading a tag 102 on a collection bin 100 passing by, but can read the tag 102 on a collection bin 100 while the scrap is being dumped into the waste bin 300. By way of example only, the reader 302 may be positioned at the top of the waste bin 300 at one or more locations where the collection bin 100 passes as the scrap is being dumped into the waste bin 300. This embodiment requires the waste bins 300 to have a source of power to provide power to the readers 302 on the waste bin 300. In some instances, it may not be desirable to have any additional power on the waste bins 300. Alternatively the reader 302 may be passive and the collection bin 100 may contain transmission data for reader 302 to acquire, which may require power on board at the collection bin 100.

Therefore, in some embodiments, the tracking system for each collection bin 100 may have a geo-locating device 104, such as a GPS tracker, BlueTooth, NFC, Beacon Technology, or any other technology that can locate a person, place, or thing, mounted thereon. For example, assuming the geo-locating device is a GPS tracker 104, each waste bin 300 may be identified by its location, and such location may be programmed into the GPS tracker 104. In this embodiment, after the collection bin 100 has been weighed, the computer 204 can track the weighed collection bin's location via the GPS tracker 104. The location where the collection bin 100 stops for a predetermined period of time (or as defined by a passive or powered based reader) for dumping purposes is sent back to the computer 204. The waste bin 300 that corresponds to that location is identified as the waste bin 300 receiving the contents of the recently weighed collection bin 100, and the cumulative weight of scrap collected by the customer and dumped into the identified waste bin 300 can be recorded.

In other words, a geofence 304 may be established around each waste bin 300 and programmed into the GPS tracker 104 such that when a weighed collection bin 100 crosses into the geofenced region 304 of any waste bin 300a-c for a predetermined period of time (to exclude collection bins that are simply passing through a geofenced region), the weight of the scrap contained in the weighed collection bin 100 is added to the cumulative weight of scrap of the waste bin 300 in the geofenced region 304. This, however, requires additional power on the collection bin 100 to power the GPS tracking device 104. In some instances, it may be desirable not to have power on the collection bins 100.

In some embodiments, the collection bins 100 may require a vehicle to transport the collection bins 100 to the weigh station 200 and the waste bins 300, such as a forklift. In such embodiments, the vehicle may be equipped with the GPS tracker 104 to determine the vehicle's location. The GPS tracker 104 can draw power from the vehicle's power system for operation. The GPS tracker 104 may further comprise a microcontroller programmed to process the location of the GPS tracker 104, determine whether the GPS tracker 104 is residing within a geofenced region 304, or whether the GPS tracker 104 is merely passing through a geofenced region 304; and, if determined to be residing within a geofenced region 304, identify the waste bin 300 within the detected geofenced region 304 and report the identification of the waste bin 300 in the detected geofenced region 304 to the main computer 204 to process the weight of scrap being added to the identified waste bin 300 from its proper source.

The computer 204 at the weigh station comprises a processor; a database for storing information; and a memory operatively coupled to the processor. The computer 204 may further comprise additional equipment associated with a computer 204 such as a monitor and input device (keyboard, touch screen, mouse, monitor, etc.). The memory stores program instructions that when executed by the processor, causes the processor to perform functions described herein. For example, the computer 204 may be configured to record and process the weight of scrap in the collection bins 100 and/or the waste bins 300. The computer 204 may be configured to identify which collection bins 100 are dumping their respective scrap into which waste bins 300 so as to monitor and record the cumulative weight of scrap in each waste bin 300 for each customer. The computer 204 may be configured to process information gathered and convert the information into a receipt that is printable on-site or off-site. The computer 204 may comprise a communication system to transmit information off-site for long-term storage or processing, such as wireless transmission, cellular transmission, and the like.

The communication system can be used to communicate with the service provider, the customer, or any other designee about any and all activity that is occurring in real time or on a time deferred basis. For example, with knowledge of the ongoing activities at a facility, a service provider could know when a waste bin is about to reach capacity, and have a truck en route to pick up and replace the waste bin without the customer having to call for the service. Therefore, the present invention has the ability, by virtue of tracking and reporting weights in real time, to predict and alert any interested party that the waste bin 300 has reached a predetermined capacity. This is useful because part of the relationship between a service provider and customer is to properly communicate when the waste bin 300 is full and ready for pickup. If the customer fails to provide such notice, the service provider will not make a pickup, creating a potential bottleneck at the facility and potential altercation between the service provider and the customer. So this system will enhance efficiency by having the ability to automatically alert any party that the waste bin 300 is "ready for pickup" because it has reached a certain weight value.

Customers can establish an account, such as an online account, and customize their profile to have certain types of communications and alerts sent to them via email, text, phone call, and the like, in real time. In addition, the system can keep track of all activities of a customer allowing the customer to log into its account and have a record of all of its activities. The system may be a cloud-based system in which the customer can review its activities based on timing, amounts, revenue, and the like. For example, the customer can view its activities on a week-to-week, month-to-month, year-to-year basis, and more. Additional information provided by the system can include, for example, how much scrap a facility produced, from which lines, precisely when, and how much revenue the scrap generated. The system can be customized by the customer to establish the types of information to be recorded and reported.

In some embodiments, the system may be provided as a kit to be installed at an existing facility that already has collection bins, waste bins, and scales. As such, the system for accounting for scrap removal may comprise a tag 102 containing identifying information of a customer, a reader 206 for reading the tag 102, and a computer 204 operatively connected to the reader 206. The tag 102 may be attached to existing collection bins 100 on the facility. The reader 206 and computer 204 may be positioned near a scale 202. The positioning of the tag 102 and the reader 206 are such that when the collection bin 100 is placed on the scale 202 to be weighed, the tag 102 is positioned sufficiently close to the reader 206 to allow the reader 206 to read the tag 102. The computer 204 may be operatively connected to the scale 202 so that weight information measured on the scale 202 can be transmitted to the computer 204. The computer 204 may comprise a communication module to send the identifying information of the customer and the weight information of the scrap to a computer off-site, or to transmit any other type of communications to any other remote location.

When the collection bin 100 full of scrap is placed on the scale 202, the weight information from the scale 202 is transmitted to the computer 204. In the meanwhile, the reader 206 reads the tag 102 when the collection bin 100 is placed on the scale 202. The reader 206 then transmits the identifying information from the tag 102 to the computer 204. The computer 204 may be configured to process the identifying information of the customer from the reader 206, as well as process weight information of the scrap collected by the customer; and correlate the weight information with the customer to keep track of the cumulated weight of scrap collected by the customer from subsequent weighing events.

If the customer does not have a scale 202, a scale 202 can be included in the system. As such, the system may further comprise a scale 202 operatively connected to the computer 204 to weigh the scrap and obtain the weight information of the scrap.

If the customer does not have collection bins 100, collection bins 100 may be provided to the customer. When collection bins 100 are provided to the customer, the tags 102 may be pre-installed on the collection bins 100. Therefore, the system may further comprise a collection bin 100 to receive and contain the scrap to be weighed on the scale 202 with the tag 102 attached to the collection bin 100.

If the customer does not have a waste bin 300, a waste bin 300 may be provided. Depending on the version of the waste bin 300, other accessories may be pre-installed on the waste bin 300, such as a reader 206. Therefore, the system may further comprise a waste bin 300 to receive the scrap that has been weighed.

Additional accessories may be purchased separately or as a package deal. For example, the system may further comprise a camera 208 that monitors movement of the collection bins, a geo-locating device 104 operatively connected to a collection bin 100 to monitor movement of the collection bin 100, and the like. The geo-locating device 104 may be configured to designate a geofenced region 304 for each waste bin 300 to determine when each collection bin 100 has entered one of the geofenced regions 304.

Depending on the customer's needs, the system provided may comprise at least one tag 102, at least one reader 206, and at least one computer 204. Optionally, system may further comprise at least one collection bin 100, at least one waste bin 200, and/or at least one scale 202. If multiple computers are provided, the computers may be networked to communicate with each other and share information.

Portions of the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet 20 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by online service providers, as well as the "wireless Web" provided by various wireless networking providers, especially those in the cellular phone industry. It will be appreciated that the present application could apply in any such interactive communication environments; however, for purposes of discussion, the Web is used as an exemplary interactive hypertext environment with regard to the present application.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of removing scrap and accounting for the scrap removed from a facility to prevent fraud, the method comprising:
   a. providing a weigh station on-site to weigh the scrap;
   b. providing a computer operatively connected to the weigh station to record a weight of the scrap;
   c. providing at least one collection bin for collecting the scrap, the collection bin being transportable to the weigh station for weighing at the weigh station;
   d. providing at least one waste bin for receiving scrap after weighing at the weigh station;
   e. recording cumulated weights of all weighed scrap within a designated period of time for at least one customer;
   f. correlating the cumulated weights to the at least one customer for accounting purposes; and
   g. generating a receipt to account for the scrap received, whereby all of the scrap collected by the at least one customer is accounted.

2. The method of claim 1, further comprising assigning the at least one waste bin to at least one customer.

3. The method of claim 1, further comprising providing a plurality of weigh stations.

4. The method of claim 1, further comprising providing at least one tag operatively connected to a respective collection bin, and providing at least one reader operatively connected to a respective waste bin.

5. The method of claim 1, further comprising providing a tracking system to keep track of each collection bin.

6. The method of claim 5, wherein the tracking system comprises a plurality of tags and a reader, wherein each collection bin is labeled with one of the plurality of tags, and wherein the reader is placed at the weigh station.

7. The method of claim 6, further comprising reading the tag of one of the collection bins when the collection bin is being weighed, and tracking the cumulated weight of scrap weighed at the weigh station for each collection bin.

8. The method of claim 5, wherein the tracking system comprises a camera that monitors movement of the collection bins.

9. The method of claim 8, wherein the facility comprises a plurality of origin points where the scrap is collected, wherein each origin point comprises a unique identifying label corresponding to one customer, wherein the camera detects the identifying label and the collection bin to keep track of the cumulated weight of scrap for the customer.

10. The method of claim 5, wherein the tracking system comprises a plurality of geo-locating devices, one geo-locating device for monitoring movement of each collection bin.

11. A system for weighing and accounting for scrap to prevent fraud, comprising:
   a. a weigh station for weighing the scrap;
   b. a computer for keeping track of cumulated weight of scrap;
   c. at least one collection bin for receiving scrap the at least one collection bin being separate and apart from the weigh station, and transportable to the weigh station; and
   d. at least one waste bin separate and apart from the weigh station for accumulating the scrap.

12. The system of claim 11, wherein the weigh station comprises a scale and the computer is operatively connected to the scale.

13. The system of claim 11, further comprising a tracking system to monitor movement of the at least one collection bin.

14. The system of claim 13, wherein the tracking system comprises a plurality of tags, one tag operatively connected to one collection bin, and wherein the weigh station comprises a reader to read the tags.

15. The system of claim 14, further comprising a plurality of waste bins and a plurality of readers, wherein each waste bin comprises one of the plurality of readers.

16. The system of claim 13, wherein the tracking system comprises a camera system positioned at the weigh station and operatively connected to the computer to monitor movement of the collection bins.

17. The system of claim 13, wherein the tracking system comprises a geo-locating device to monitor movement of the collection bins.

18. A system for accounting for scrap removal and prevent fraud, the system comprising:
   a. at least one tag containing identifying information;
   b. a reader for reading the at least one tag;
   c. a computer operatively connected to the reader, the computer configured to:
      i. process the identifying information from the reader;
      ii. process weight information of the scrap collected; and
      iii. correlate the weight information with a customer to keep track of cumulated weight collected by the customer;
   d. a scale operatively connected to the computer to weigh the scrap and obtain the weight information of the scrap;
   e. at least one collection bin separate and apart from the scale and transportable to the scale; and
   f. at least one waste bin separate and apart from the scale for accumulating scrap after being weighed.

19. The system of claim 18, wherein the at least one collection bin is operatively connected to the at least one tag.

20. The system of claim 19, further comprising a plurality of waste bins.

21. The system of claim 20, further comprising a plurality of weigh stations.

22. The system of claim 20, further comprising a plurality of readers, one reader operatively connected to each waste bin.

23. The system of claim 19, further comprising a plurality of geo-locating devices, one geo-locating device associated with one collection bin of the plurality of collection bins to monitor movement of the collection bins.

24. The system of claim 23, further comprising a plurality of waste bins, wherein the geo-locating devices are configured to designate a geofenced region for each waste bin to determine when each collection bin has entered one of the geofenced regions.

25. The system of claim 19, further comprising a camera that monitors movement of the collection bins.

26. A system for weighing and accounting for scrap and prevent fraud, comprising:
   a. a plurality of collection bins for collecting the scrap;
   b. a weigh station comprising a scale to weigh the scrap and obtain weight information of the scrap, the weigh station separate and apart from the plurality of collection bins;
   c. a plurality of waste bins for accumulating the scrap, the plurality of waste bins separate and apart from the weigh station;
   d. a tracking system for monitoring movement of the plurality of collection bins, wherein the tracking system comprises:
      i. a plurality of tags, each tag containing identifying information of a different customer, one tag operatively connected to each collection bin,
      ii. a reader mounted at the weigh station to read the tags as the tags are being weighed,
      iii. a camera system positioned at the weigh station and operatively connected to the computer to monitor movement of the collection bins, and
      iv. a geo-locating device to monitor movement of the collection bins;
   e. a first computer for keeping track of cumulated weight of the scrap, wherein the first computer is operatively connected to the scale, wherein the first computer comprises a communication module to the transmit identifying information from the tags and weight information of the scrap to a second computer, the first computer programmed to:
      i. process the identifying information from the reader;
      ii. process weight information of the scrap collected; and
      iii. correlate the weight information with one of a plurality of customers to keep track of cumulated weight collected by each customer.

* * * * *